United States Patent
Kikuchi et al.

[11] Patent Number: 6,157,523
[45] Date of Patent: *Dec. 5, 2000

[54] SPIN VALVE MAGNETORESISTIVE HEAD HAVING MAGNETIC LAYERS WITH DIFFERENT INTERNAL STRESS

[75] Inventors: Hideyuki Kikuchi; Kazuo Kobayashi; Hitoshi Kishi; Mitsuru Otagiri, all of Kanagawa, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/524,348
[22] Filed: Sep. 6, 1995

[30] Foreign Application Priority Data

Dec. 21, 1994 [JP] Japan .................................. 6-318791

[51] Int. Cl.[7] ........................................................ G11B 5/39
[52] U.S. Cl. .................................................... 360/324.11
[58] Field of Search ...................................... 360/113, 126, 360/324.11

[56] References Cited

U.S. PATENT DOCUMENTS

| | | |
|---|---|---|
| 4,995,024 | 2/1991 | Arimune et al. .................. 360/131 |
| 5,010,433 | 4/1991 | Kitada et al. ..................... 360/113 |
| 5,079,662 | 1/1992 | Kawakami et al. ................ 360/113 |
| 5,149,409 | 9/1992 | Ahlert et al. ................... 204/192.2 |
| 5,206,590 | 4/1993 | Dieny et al. ..................... 324/252 |
| 5,452,163 | 9/1995 | Coffey et al. ..................... 360/113 |
| 5,461,526 | 10/1995 | Hamakawa et al. ............... 360/113 |

FOREIGN PATENT DOCUMENTS 4-247607  9/1992  Japan .
4-275471  10/1992  Japan .

*Primary Examiner*—Craig A. Renner
*Attorney, Agent, or Firm*—Greer, Burns & Crain, Ltd.

[57] ABSTRACT

A spin valve magnetoresistive head includes a first soft magnetic layer and a second soft magnetic layer having larger internal stress than that of the first magnetic layer. The larger internal stress of the second soft magnetic layer is created by injecting the second soft magnetic layer with a selected type of ion. Also included in the head is a nonmagnetic layer formed between the first soft magnetic layer and the second soft magnetic layer.

2 Claims, 5 Drawing Sheets

$H = 0$ OR POSITIVE
$\theta = 0°$
R : SMALL

H DIRECTION ⟶ (NEGATIVE)

H ; SMALL
$\theta = 180°$
R : LARGE

H DIRECTION ⟶ (NEGATIVE)

H ; LARGE
$\theta = 0°$
R : SMALL

H : EXTERNAL MAGNETIC FIELD
$\theta$ : RELATIVE ANGLE BETWEEN M2 AND M1 DIRECTIONS
R : ELECTRIC RESISTANCE

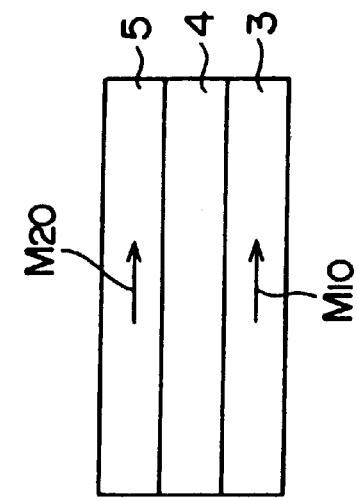
FIG.3A
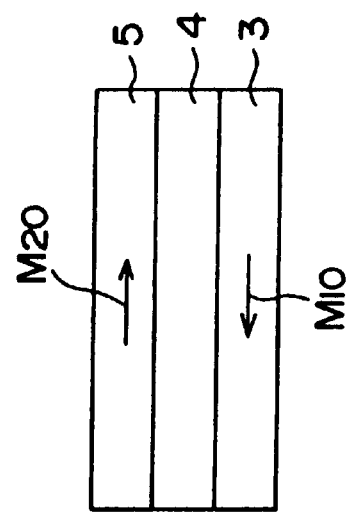
FIG.3B
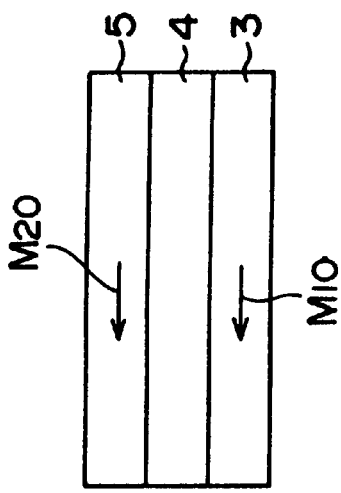
FIG.3C
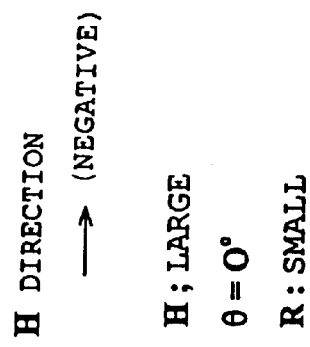

SPIN VALVE MAGNETORESISTIVE HEAD HAVING MAGNETIC LAYERS WITH DIFFERENT INTERNAL STRESS

BACKGROUND OF THE INVENTION

1. Field of the Invention

The present invention relates to a spin valve magnetoresistance head and a method of fabricating the same and, more particularly, a spin valve magnetoresistive head for reading information signal from a magnetic recording medium and a method of fabricating the same.

2. Description of the Related Art

As a magnetic transducer for reading information signals from a magnetic recording medium such as a hard disk, magnetic card, or magnetic tape, a magnetoresistive head having high reading sensitivity is well known.

Recently, as a device capable of achieving a higher magnetoresistance effect, a magnetic transducer utilizing a spin valve magnetoresistance effect has been set forth in U.S. Pat. No. 5,206,590.

FIGS. 1A to 1C shows sectional shapes of the magnetic transducer utilizing the spin valve magnetoresistance effect and an operational principle thereof. As shown in FIGS. 1A to 1C, a first soft magnetic layer 102, a nonmagnetic layer 103, a second soft magnetic layer 104 and an antiferromagnetic layer 105 are formed on a substrate 101 in that order. The antiferromagnetic layer 105 is coupled to the second soft magnetic layer 104 by means of exchange coupling to prevent easy change of the direction of magnetization M1 of the second soft magnetic layer 104. For this reason, the second soft magnetic layer 104 is called a pin layer, and the first soft magnetic layer 102 is called a free layer.

The spin valve magnetoresistance effect is defined as a phenomenon wherein electric resistance of respective above layers formed on the substrate 101 are varied by changing a relative angle θ between the direction of magnetization M1 of the second soft magnetic layer 104 and the direction of magnetization M2 of the first soft magnetic layer 102. Since the direction of magnetization M2 of the first soft magnetic layer 102 can be changed correspondingly to magnitude of an external magnetic field H, smallest electric resistance of a resultant film can be obtained if the direction of magnetization M2 of the first soft magnetic layer 102 coincides with the direction of magnetization M1 of the second soft magnetic layer 104 (i.e., the intersecting angle θ becomes zero), whereas largest electric resistance of the resultant film can be attained if the direction of magnetization M2 is directed opposedly to the direction of magnetization M1 of the second soft magnetic layer 104.

Next, change in electric resistance due to the spinvalve magnetoresistance effect will be explained in detail.

(1) FIG. 1A shows a state wherein the external magnetic field H is not applied, or a state wherein the direction of the external magnetic field H coincides with directions of magnetization M1, M2 of the first soft magnetic layer 102 and the second soft magnetic layer 104.

In this state, the directions of magnetization M1, M2 of the first soft magnetic layer 102 and the second soft magnetic layer 104 formed opposedly to each other via the nonmagnetic layer 103 are directed in the same direction. Therefore, the intersecting angle θ of the directions of magnetization M1, M2 becomes zero. At this time, scattering of conduction electrons flowing in the first soft magnetic layer 102 and the second soft magnetic layer 104 and the nonmagnetic layer 103 is decreased. Thus, the electric resistance R of these layers becomes small.

(2) FIG. 1B shows a state wherein the external magnetic field H with the opposite direction to the direction of magnetization M1 of the second soft magnetic layer 104 is applied.

In this state, if the external magnetic field H with a magnitude permitting only the first soft magnetic layer 102 to direct in the opposite direction to that of the magnetization M1 of the second soft magnetic layer 104 is applied, the intersecting angle θ between the magnetization M1, M2 becomes 180°. In this case, scattering of conduction electrons in respective layers of the first soft magnetic layer 102 and the second soft magnetic layer 104 and the nonmagnetic layer 103 is increased because the directions of magnetization M1, M2 do not coincide with each other. Thus, the electric resistance R of these layers becomes large.

(3) FIG. 1C shows a state wherein the external magnetic field H with a magnitude permitting the direction of magnetization M1 of the second ferromagnetic layer by removing exchange coupling of the antiferromagnetic layer 105 and the second ferromagnetic layer is applied.

In this state, the directions of magnetization M1, M2 of the first soft magnetic layer 102 and the second soft magnetic layer 104 coincide with each other. Therefore, the intersecting angle θ becomes zero so that electric resistance R is decreased.

With the above, in the spin valve magnetoresistive head, the electric resistance R of the first soft magnetic layer 102 and the second soft magnetic layer 104 and the nonmagnetic layer 103 can be changed in response to the direction and magnitude of the external magnetic field H. Therefore, information included in the magnetic field supplied from the magnetic medium may be read by detecting change in the electric resistance R. The electric field caused by the magnetic medium generates external magnetic field H.

In such spin valve magnetoresistive head, in general, as a material of the antiferromagnetic layer 105 used for suppressing change in magnetization M1 of the second soft magnetic layer 104, iron-manganese (FeMn) has been used. But, there is a drawback in that characteristics of the head device deteriorate since the FeMn is readily oxidized.

On the contrary, the spin valve magnetoresistive head without such antiferromagnetic layer has been set forth in Patent Application Publication (KOKAI) 4-247607. In this head device, in order to obtain different coercive force, two soft magnetic layers sandwiching the nonmagnetic layer therebetween are formed respectively of different materials.

However, since the upper crystal structure depends on the lower crystal structure, the crystal structure of the upper soft magnetic layer changes because of difference of crystal structures. For this reason, in contrast to the case wherein two soft magnetic layers are formed of the same materials, magnetic characteristics of the upper soft magnetic layer become different. As a result, this decreases a change ratio of magnetic resistance (resistance change ratio/applied external magnetic field).

SUMMARY OF THE INVENTION

An object of the present invention is to provide a spin valve magnetoresistive head for improving corrosion resistance against a gas included in the air and a fabricating method thereof.

According to the present invention, in a spin valve magnetoresistive head, elements such as boron, nitrogen, oxygen, carbon, argon, and neon are injected into one of two soft magnetic layers sandwiching a nonmagnetic layer therebetween.

For this reason, since stress is caused correspondingly in the soft magnetic layers into which such elements are ion-injected, movement of a magnetic wall can be suppressed and thus coercive force can be increased. In other words, different strengths of the external magnetic field required for inverting the direction of magnetization are needed in the ion-injected soft magnetic layer and in the ion-uninjected soft magnetic layer. Therefore, in the ion-injected soft magnetic layer, it becomes hard to change the direction of magnetization. In this case, since the magnetization can be fixed in such degree that the magnetization cannot be changed by signals from the magnetic medium, exchange coupling by the antiferromagnetic layer is not required.

As can be seen from the above, the antiferromagnetic layer for fixing the magnetization direction of one of the soft magnetic layers can be eliminated. As a result, deterioration in performance of the spin valve magneto-resistance head can be prevented.

BRIEF DESCRIPTION OF THE DRAWINGS

FIGS. 3A to 3C are sectional views illustrating an operation of the first embodiment of the present invention;

DESCRIPTION OF THE PREFERRED EMBODIMENTS

There will now be described preferred embodiments of the present invention hereinafter with reference to the accompanying drawings.

First Embodiment

Figure 1A:
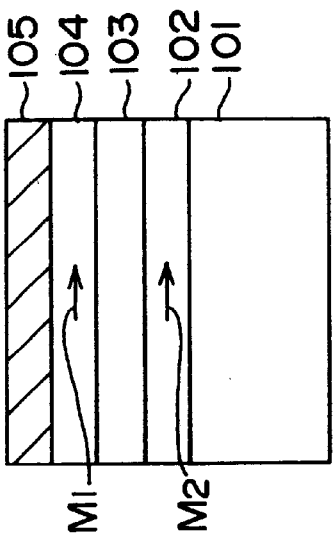
FIGS. 1A to 1C are sectional views respectively illustrating an operation of the conventional spin valve magnetoresistive head.
Figure 1B:
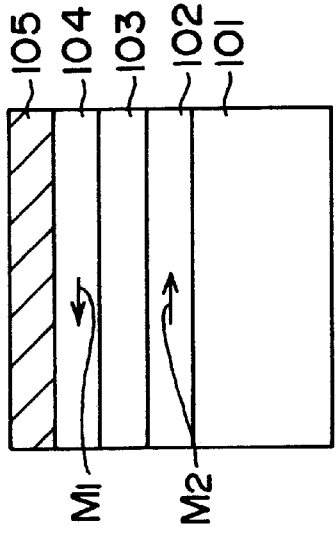
Figure 1C:
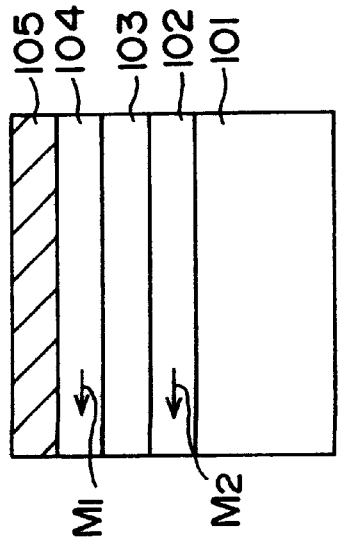
Figure 2A:
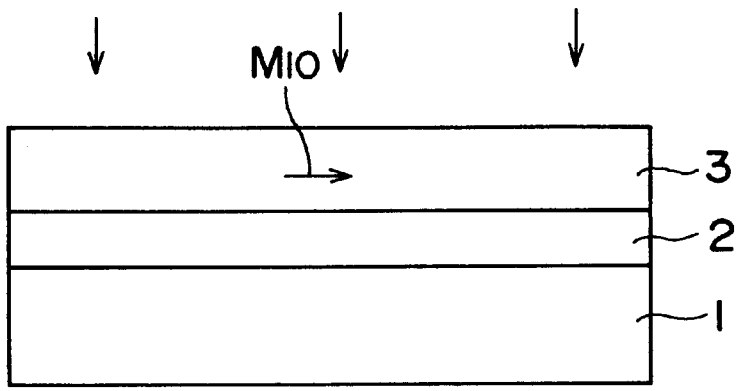
FIGS. 2A and 2B are sectional views showing manufacturing steps of the spin valve magnetoresistive head according to a first embodiment of the present invention.
Figure 2B:
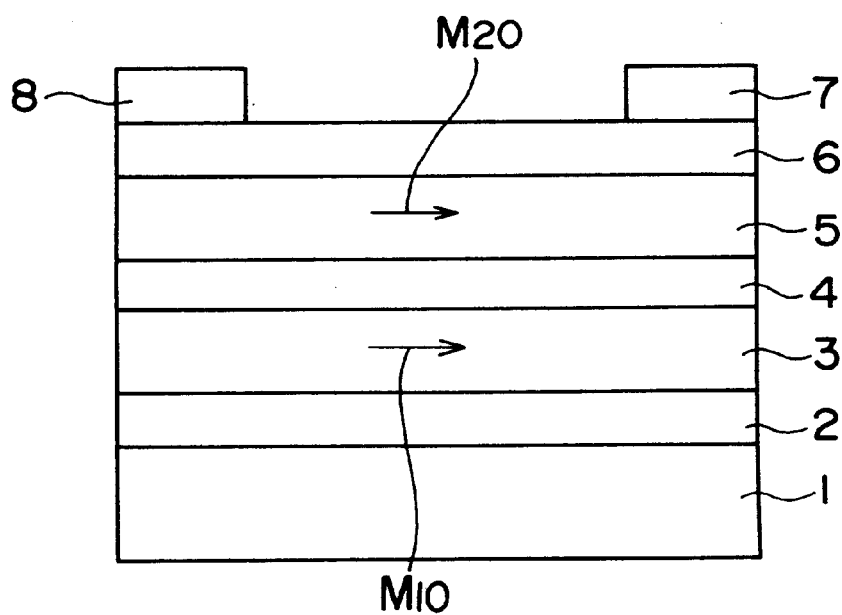

FIGS. 2A and 2B are sectional views each showing a layer structure of a spin valve magnetoresistive head according to a first embodiment of the present invention.

First, as shown in FIG. 2A, an intermediate layer 2 formed of tantalum (Ta) and having a thickness of 40 Å, and a first soft magnetic layer 3 formed of iron-nickel (FeNi) and having a thickness of 100 Å are formed by a sputtering process in that order while the magnetic field of 30 Oe is applied to (100) face of the silicon substrate 1 in one direction parallel to the surface of the substrate 1.

Subsequently, under the conditions of acceleration energy of 20 keV, electric current of 120 $\mu$A, and dose amount of $1 \times 10^{16}$ ions/cm$^2$, boron (B) ions are injected into the soft magnetic layer 3.

Then, as shown in FIG. 2B, with keeping the same magnetic field conditions as the above, a nonmagnetic layer 4 formed of copper (Cu) or copper alloy and having a thickness of 20 Å, a second soft magnetic layer 5 formed of FeNi and having a thickness of 60 Å, and a cover film 6 formed of Ta and having a thickness of 40 Å are formed on the first soft magnetic layer 3 by sputtering process in that order.

After this, although not shown especially, respective layers from the intermediate layer 2 to the cover film 6 are patterned as a plane rectangular shape. Then, electrodes 7, 8 formed of Au, etc. are formed on an upper surface of the cover film 6 near both sides thereof. Subsequently, the silicon substrate 1 is cut off, so that the spin valve magnetoresistive head has been completed.

According to the spin valve magnetoresistive head above, since elements not included originally in its constituent materials are ion-injected into the first soft magnetic layer 3, structural defects and distortions are generated in most crystals of the first soft magnetic layer 3 due to injected elements in comparison with the state obtained before ions are not injected. As a result, stress is caused in the first soft magnetic layer 3, and movement of internal magnetic walls can be suppressed to thus increase coercive force (Hc).

Since coercive force is increased depending on an amount of ion injection, it can be adjusted. However, an amount of ion injection enabling the first soft magnetic layer 3 to be perfectly converted into an amorphous state is not suitable because it decreases coercive force. In addition, if ions are injected into part of the first soft magnetic layer 3, the device cannot be operated as the spin valve magnetoresistive head since areas, which have small coercive force and the direction of magnetization of which is changeable by the external magnetic field, are generated.

Because of an increase of coercive-force, it becomes difficult to change the direction of magnetization M10 of the first soft magnetic layer 3 by the external magnetic field. In other words, the external magnetic field H required for inverting magnetization M10 of the first soft magnetic layer 3 becomes larger than that required for inverting magnetization M20 of the second soft magnetic layer 5.

Next, change in electric resistance R of the spin valve magnetoresistive head caused by the external magnetic field H will be explained.

First, as shown in FIG. 3A, if the external magnetic field H is set to be zero, magnetization M10, M20 of the first soft magnetic layer 3 and the second soft magnetic layer 5 are directed in the same direction. Therefore, scattering of conduction electrons supplied from the electrodes to these layers is reduced. As a result, electric current is increased whereas electric resistance R is decreased.

Subsequently, as shown in FIG. 3B, only the direction of magnetization M20 of the second soft magnetic layer 5 is rotated by increasing the external magnetic field H. Thus, the intersecting angle θ between the directions of magnetization M10, M20 of the first soft magnetic layer 3 and the second soft magnetic layer 5 is increased to 180°. In this case, scattering of conduction electrons flowing into the first soft magnetic layer 3 and the second soft magnetic layer 5 is increased. As a result, electric current becomes small while electric resistance R becomes large.

In addition, as shown in FIG. 3C, if the directions of magnetization M10, M20 of the first soft magnetic layer 3 and the second soft magnetic layer 5 are inverted by increasing the external magnetic field H, scattering of conductive electrons generated in these layers is reduced so that electric current is increased. As a result, electric resistance R becomes small.

As described above, according to the spin valve magneto-resistance head of the first embodiment, the antiferromagnetic layer is not used, and not only the corrosion resistance can be improved but also the thin device having low resistance can be achieved.

In the above explanations, magnetization M10, M20 of the first soft magnetic layer 3 and the second magnetic layer 5 are directed in the same direction under no application of the external magnetic field for easy understanding. However, in order to change linearly electric resistance which depends on the external magnetic field, it is preferable to magnetize the first soft magnetic layer 3 and the second soft magnetic layer 5 such that magnetization M10, M20 intersect to each other relatively orthogonally.

Further, in the above explanations, boron is used as an element which is ion-injected into the first soft magnetic layer 3. However, other elements not used in magnetic materials, for example, one kind or more of rare gas such as neon (Ne), argon (Ar), krypton (Kr), xenon (Xe), nitrogen (N), oxygen (O), carbon (C) may be used. Otherwise, other elements used in magnetic materials may also be used.

Although FeNi is used as the material of the soft magnetic layer above, cobalt-nickel, cobalt-iron-nickel, etc. may be used.

Second Embodiment

In the first embodiment described above, ions are injected into the first soft magnetic layer 3 located near the substrate. However, in the second embodiment of the present invention, ions may be injected into the second soft magnetic layer 5 formed on the first soft magnetic layer 3 to enhance coercive force of the second soft magnetic layer 5.

Figure 4A:
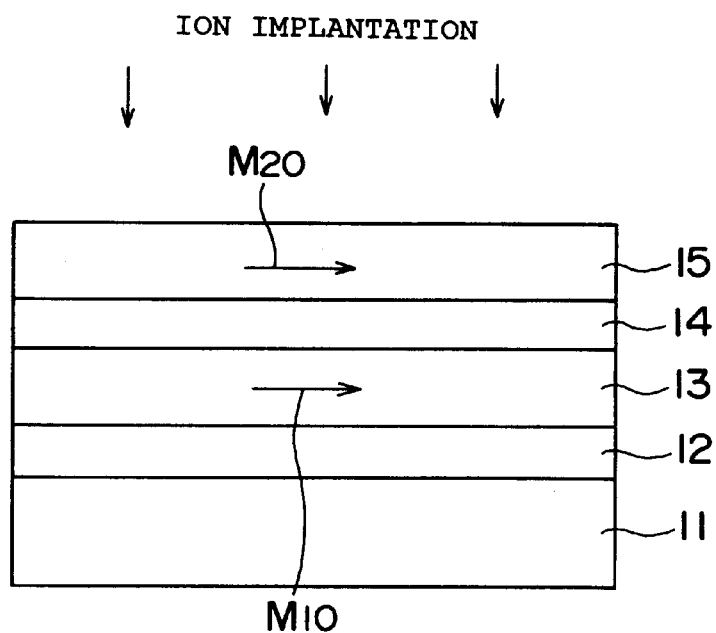
FIGS. 4A and 4B are sectional views showing fabricating steps of a spin valve magnetoresistive head according to a second embodiment of the present invention 1.

For instance, as shown in FIG. 4A, while applying the magnetic field to (100) face of the silicon substrate 11 in one direction parallel to the surface of the substrate 11, an intermediate layer 12 having a thickness of 40 Å, a first soft magnetic layer 13 having a thickness of 60 Å, a nonmagnetic layer 14 having a thickness of 20 Å, and a second soft magnetic layer 15 having a thickness of 10 Å are formed by sputtering process in that order. Materials of these layers on the silicon substrate 11 are the same as those of the first embodiment.

Subsequently, under the conditions of acceleration energy of 20 keV, electric current of 120 $\mu$A, and dose amount of $1\times10^{16}$ ions/cm$^2$, borons are injected into the second soft magnetic layer 15. Since a depth of ion injection can be adjusted by controlling the acceleration energy, ions are not injected into the nonmagnetic layer 14.

Figure 4B:
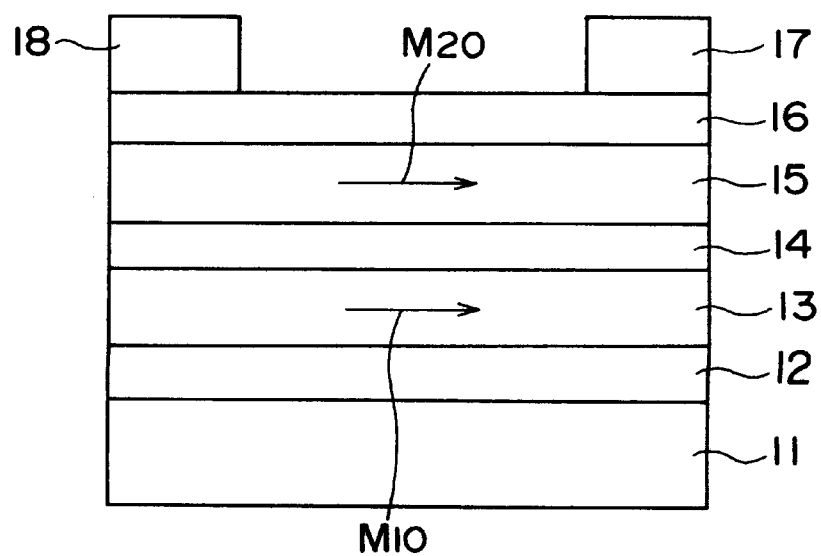

After this, as shown in FIG. 4B, under the same magnetic field conditions as those of the first embodiment, a cover film 16 is formed on the second soft magnetic layer 15 by sputtering process to have a thickness of 40 Å. Subsequently, although not shown, respective layers from the intermediate layer 12 to the cover film 16 are patterned to have a planer rectangular shape. Then, electrodes 17, 18 formed of Au, etc. are formed on an upper surface of the cover film 16 near both sides thereof. Thereafter, the silicon substrate 11 is cut off, thus completing the spin valve magnetoresistive head of the second embodiment.

In the second embodiment, since coercive force of the second soft magnetic layer 15 has been increased, the direction of magnetization can be changed only in the first soft magnetic layer 13 by the external magnetic field. Other operations caused by the external magnetic field are identical to those of the first embodiment, and therefore their explanations are omitted.

In addition, since iron-manganese having a bad corrosion resistance property is also not used in the second embodiment, deterioration in characteristics of the spin valve magneto-resistance head can be reduced.

Further, if acceleration energy is increased upon injecting ions, ions may be injected only into the first soft magnetic layer 13 after respective layers are formed on the silicon substrate 11.

Third Embodiment

Next, a magnetic head of a magnetic recording apparatus to which the spin valve MR device described above can be applied and a magnetic recording medium will be described briefly with reference to FIG. 5.

Figure 5:
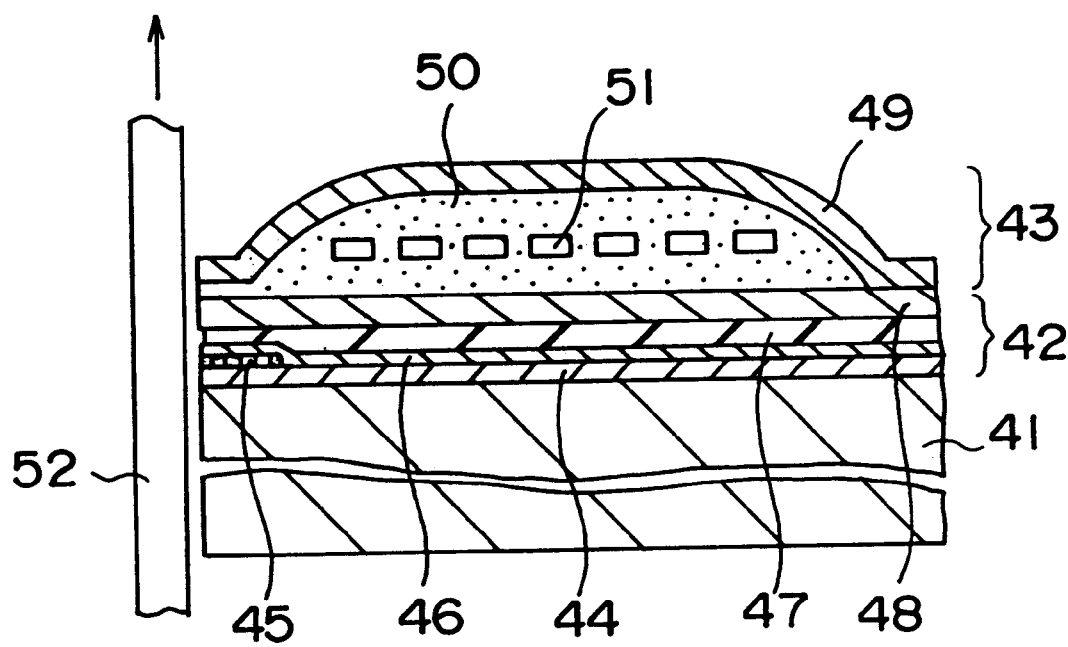
FIG. 5 is a sectional view showing a pertinent portion of a magnetic recording apparatus to which each of spin valve devices according to the first to third embodiments of the present invention can be applied.

Referring to FIG. 5, a reproducing head 42 and a writing head 43 are formed adjacently on a substrate 41 made of silicon.

The reproducing head 42 comprises a first magnetic shield layer 44, an spin valve MR device 45 formed on the first magnetic shield layer 44 via an insulating layer (not shown), a connecting electrode 46 connected to the spin valve MR device 45, an insulating film 47 for covering the spin valve MR device 45 and the connecting electrode 46, and a second magnetic shield layer 48 formed on the insulating film 47. The spin valve MR devices 45 having the same structures as those described in the above embodiments are employed.

While, the writing head 43 comprises the second magnetic shield layer 48, a third magnetic shield layer 49, and a coil 51 formed therebetween via an insulating layer 50. Each of the first to third magnetic shield layers 44, 48 and 49 is made of a soft magnetic material. In the first to third magnetic shield layers 44, 48 and 49, air gaps are formed in portions thereof opposed to the magnetic recording medium 52.

What is claimed is:

1. A spin valve magnetoresistive head using different coercivities of soft magnetic layers, comprising:

a first soft magnetic layer having a first coercivity;

a second soft magnetic layer having a second coercivity which is higher than said first coercivity, said second soft magnetic layer having larger internal stress than that of said first soft magnetic layer, said larger internal stress being created by injecting a sense region of said second soft magnetic layer with a selected type of ion at a predetermined amount; and a nonmagnetic layer formed between said first soft magnetic layer and said second soft magnetic layer;

wherein a first magnetic field required for changing a direction of magnetization of said second soft magnetic layer is greater than a second magnetic field required for changing a direction of magnetization of said first soft magnetic layer.

2. A spin valve magnetoresistive head according to claim 1, wherein said ion is selected from a group consisting of boron, nitrogen, oxygen, carbon, argon, and neon.

* * * * *